(12) United States Patent
Meng et al.

(10) Patent No.: US 11,379,959 B2
(45) Date of Patent: Jul. 5, 2022

(54) METHOD FOR GENERATING HIGH DYNAMIC RANGE IMAGE FROM LOW DYNAMIC RANGE IMAGE

(71) Applicant: Suzhou Keda Technology Co., Ltd., Jiangsu (CN)

(72) Inventors: Guoqing Meng, Jiangsu (CN); Fengfeng Tang, Jiangsu (CN); Yong Zhang, Jiangsu (CN); Lijun Cao, Jiangsu (CN)

(73) Assignee: Suzhou Keda Technology Co., Ltd., Jiangsu (CN)

( * ) Notice: Subject to any disclaimer, the term of this patent is extended or adjusted under 35 U.S.C. 154(b) by 504 days.

(21) Appl. No.: 16/519,575

(22) Filed: Jul. 23, 2019

(65) Prior Publication Data

US 2019/0347777 A1 Nov. 14, 2019

Related U.S. Application Data

(63) Continuation of application No. PCT/CN2017/117165, filed on Dec. 19, 2017.

(30) Foreign Application Priority Data

Jan. 23, 2017 (CN) .......................... 201710057890.3

(51) Int. Cl.
*G06T 5/00* (2006.01)
*G06T 7/136* (2017.01)
*G06T 5/30* (2006.01)

(52) U.S. Cl.
CPC .............. *G06T 5/009* (2013.01); *G06T 5/002* (2013.01); *G06T 5/30* (2013.01); *G06T 7/136* (2017.01);
(Continued)

(58) Field of Classification Search
CPC .......... G06T 2207/20208; G06T 9/007; H04N 19/46; H04N 19/98
See application file for complete search history.

(56) References Cited

U.S. PATENT DOCUMENTS

| 2004/0101170 A1* | 5/2004 | Tisse ...................... G06V 40/18 382/117 |
| 2006/0104508 A1 | 5/2006 | Daly et al. |

(Continued)

FOREIGN PATENT DOCUMENTS

| CN | 1954339 A | 4/2007 |
| CN | 106033600 A | 10/2016 |
| CN | 106886386 A | 6/2017 |

OTHER PUBLICATIONS

European Search Report of corresponding application EP 17893448.5 dated Dec. 20, 2019; 4 pages.
(Continued)

*Primary Examiner* — Ming Wu
(74) *Attorney, Agent, or Firm* — Young Basile Hanlon & MacFarlane, P.C.

(57) ABSTRACT

The present disclosure provides a method for generating a high dynamic range image from a low dynamic range image, including performing grey-level adjustment on a low dynamic range image to be processed in accordance with a preset mapping relationship to obtain an image after the grey-level adjustment, the grey-level adjustment includes inverse-gamma correction and grey-level value increase; selecting a plurality of saturation areas in the image after the grey-level adjustment; performing grey-level enhancement of the saturation areas in the image after the grey-level adjustment, to obtain a target high dynamic range image; and outputting the target high dynamic range image.

13 Claims, 7 Drawing Sheets

(52) U.S. Cl.
CPC ............... *G06T 2207/20016* (2013.01); *G06T 2207/20192* (2013.01); *G06T 2207/20208* (2013.01)

(56) References Cited

U.S. PATENT DOCUMENTS

| | | |
|---|---|---|
| 2007/0269104 A1 | 11/2007 | Whitehead et al. |
| 2012/0176399 A1 | 7/2012 | Whitehead et al. |
| 2014/0044372 A1* | 2/2014 | Mertens ................ H04N 19/98 382/248 |
| 2016/0127736 A1* | 5/2016 | Touze .................... H04N 19/98 348/674 |
| 2016/0366386 A1* | 12/2016 | Douady-Pleven ........ G06T 5/50 |

OTHER PUBLICATIONS

Rempel et al., Ldr2Hdr: On-the-fly Reverse Tone Mapping of Legacy Video and Photographs; ACM Transactions on Graphics, vol. 26, No. 3, Article 39, Publication date Jul. 2007.
International Search Report and Written Opinion of corresponding application PCT/CN2017/117165; dated Mar. 12, 2018; 10 pages.
First Chinese Office Action of corresponding application CN 201700578903 dated Mar. 28, 2018; with Translation; 5 pages.
Second Chinese Office Action of corresponding application CN 201700578903 dated Sep. 30, 2018; with Translation; 5 pages.
Third Chinese Office Action of corresponding application CN 201700578903 dated Dec. 28, 2018; with Translation; 7 pages.

\* cited by examiner

METHOD FOR GENERATING HIGH DYNAMIC RANGE IMAGE FROM LOW DYNAMIC RANGE IMAGE

CROSS REFERENCE TO RELATED APPLICATIONS

This application is a continuation of International Application No. PCT/CN2017/117165, filed on Dec. 19, 2017, which is based upon and claims priority to Chinese Patent Application No. 201710057890.3, filed on Jan. 23, 2017, the entire contents of which are incorporated herein by reference.

TECHNICAL FIELD

The present invention relates to the field of image processing technology, in particular to a method for generating a high dynamic range image from a low dynamic range image, which improves image brightness and enhances saturation areas of the image.

BACKGROUND

The digital image is generally expressed in a matrix, including the row, column, and pixel value of the image, the product of the row and the column is the resolution of the image, and the row and column coordinates of the matrix correspond to the pixel value of a pixel. The size of the pixel value is related to the quantization of the brightness, and the quantized value is called a grey-level.

In practical use, a digital imaging system uses a number of binary bits to encode each color model value for a given pixel, the number of bits for each color model value may be referred to as the color depth thereof. The image is generally quantized in the range of 0 to $2^8$-1, or the color depth is 8 bits (bits), 0 corresponds to black and 255 white. For example, regarding a RGB image with the pixel value range of R, G, B channels taking a value of $2^8$ grey-levels, the maximum number of colors it can represent is $2^8 \times 2^8 \times 2^8 = 2^{24}$. These images can be called low dynamic (LDR) images. Being not able to record the real brightness in a scene, such images record limited gradient relations which have been encoded.

With the development of the digital imaging system, there are a growing number of display systems with color depth higher than 8 bits. The common professional display adopts a native 10 bit panel, which can reach a color depth above 10 bit. In particular, LED display screens, which are widely used and have high brightness, can be more than 16 bit in color depth, and up to more than 16 bit. Such an image may be referred to as a high dynamic (HDR) image. A high dynamic range image, with a dynamic range of generally more than 1000:1, is more real than a low dynamic range one and has better display effect, and has been widely used in recent years.

In addition, when the pixel value in the digital model reaches a maximum grey-level value, the pixel reaches saturation. For example, in an LDR image of 8 bit, it reaches saturation when the grey-level value is equal to 255. The main reason for saturation is the existence of a light source or reflection, and the saturation of an image will cause the loss of image information. Therefore, a method is needed to be proposed, to generate a high dynamic range image with more dark depth digits from a low dynamic range image, and to retain the information of the original image maximally.

SUMMARY

Targeting the problem in the prior art, the purpose of the present invention is to provide a method for generating a high dynamic range image from a low dynamic range image, which can improve the brightness of an image, ameliorate the blocking phenomenon of the image caused during inverse-gamma mapping, and enhance the saturation area of the image.

Embodiments of the present invention provide a method for generating a high dynamic range image from a low dynamic range image, including the following steps:

performing grey-level adjustment on a low dynamic range image to be processed in accordance with a preset mapping relationship to obtain an image after the grey-level adjustment, wherein the grey-level adjustment includes inverse-gamma correction and grey-level value increase;

selecting a plurality of saturation areas in the image after the grey-level adjustment, wherein the grey-level value of pixels in the saturation areas is greater than a preset high dynamic saturation threshold;

performing grey-level enhancement of the saturation areas in the image after the grey-level adjustment, to obtain a target high dynamic range image; and outputting the target high dynamic range image.

Preferably, performing grey-level adjustment in accordance with the following formula:

$$C(i) = (2^n - 1)\left[\frac{i}{2^m - 1}\right]^{\frac{1}{\gamma}};$$

wherein, C(i) is a grey-level value of each pixel in the image after the grey-level adjustment, i is a grey-level value of each pixel in the low dynamic range image to be processed, and $i \in [0,255]$;

m is the number of grey level of the low dynamic range image to be processed, n is the number of grey level of the image after the grey-level adjustment, and $m \leq n$; and $\gamma$ is a preset gamma value.

Preferably, performing grey-level adjustment in accordance with the following formula:

$$C(i) = \begin{cases} (2^n - 1)\left[\frac{i}{2^m - 1}\right]^{\frac{1}{\gamma}}, & i \geq \frac{\gamma}{8}2^n \\ k \cdot i, & i < \frac{\gamma}{8}2^n \end{cases};$$

$$k = \frac{C(\frac{\gamma}{8}2^n)}{\frac{\gamma}{8}2^n};$$

wherein, C(i) is a grey-level value of each pixel in the image after the grey-level adjustment, i is a grey-level value of each pixel in the low dynamic range image to be processed, and $i \in [0,255]$;

m is the number of grey level of the low dynamic range image to be processed, n is the number of grey level of the image after the grey-level adjustment, and $m \leq n$; and;

$\gamma$ is a preset gamma value.

Preferably, performing grey-level adjustment in accordance with the following formula:

$$C(i) = \begin{cases} (2^n-1)\left[\dfrac{i}{2^m-1}\right]^{\frac{1}{\gamma}}, & i \ge \dfrac{\gamma}{8}2^n \\ \left(k\cdot i+(2^n-1)\left[\dfrac{i}{2^m-1}\right]^{\frac{1}{\gamma}}\right)/2, & i < \dfrac{\gamma}{8}2^n \end{cases};$$

$$k = \dfrac{C(\dfrac{\gamma}{8}2^n)}{\dfrac{\gamma}{8}2^n};$$

wherein, C(i) is a grey-level value of each pixel in the image after the grey-level adjustment, i is a grey-level value of each pixel in the low dynamic range image to be processed, and i∈[0,255];

m is the number of grey level of the low dynamic range image to be processed, n is the number of grey level of the image after the grey-level adjustment, and m≤n; and γ is a preset gamma value.

Preferably, the grey-level adjustment further includes grey-level compression, and performing grey-level adjustment in accordance with the following formula:

$$C(i) = \begin{cases} \beta\cdot(2^n-1)\left[\dfrac{i}{2^m-1}\right]^{\frac{1}{\gamma}}, & i \ge \dfrac{\gamma}{8}2^n \\ \beta\cdot k\cdot i, & i < \dfrac{\gamma}{8}2^n \end{cases};$$

$$k = \dfrac{C(\dfrac{\gamma}{8}2^n)}{\dfrac{\gamma}{8}2^n};$$

wherein, C(i) is a grey-level value of each pixel in the image after the grey-level adjustment, i is a grey-level value of each pixel in the low dynamic range image to be processed, and i∈[0,255];

m is the number of grey level of the low dynamic range image to be processed, n is the number of grey level of the image after the grey-level adjustment, and m≤n; and γ is a preset gamma value, β is a preset compression factor, and 0≤β≤1.

Preferably, the grey-level adjustment further includes grey-level compression, and performing grey-level adjustment in accordance with the following formula:

$$C(i) = \begin{cases} \beta\cdot(2^n-1)\left[\dfrac{i}{2^m-1}\right]^{\frac{1}{\gamma}}, & i \ge \dfrac{\gamma}{8}2^n \\ \beta\cdot\left(k\cdot i+(2^n-1)\left[\dfrac{i}{2^m-1}\right]^{\frac{1}{\gamma}}\right)/2, & i < \dfrac{\gamma}{8}2^n \end{cases};$$

$$k = \dfrac{C(\dfrac{\gamma}{8}2^n)}{\dfrac{\gamma}{8}2^n};$$

wherein, C(i) is a grey-level value of each pixel in the image after the grey-level adjustment, i is a grey-level value of each pixel in the low dynamic range image to be processed, and i ∈[0,255];

m is the number of grey level of the low dynamic range image to be processed, n is the number of grey level of the image after the grey-level adjustment, and m≤n; and γ is a preset gamma value, β is a preset compression factor, and 0<β≤1.

Preferably, the grey-level enhancement comprises the following steps:

generating a smooth enhancement mask;

generating a grey-level enhancement mask in accordance with the smooth enhancement mask;

enhancing the grey-level value of the saturation areas in the image after the grey-level adjustment from a range of ($T_{HDR}$, $Value_1$) to a range of ($T_{HDR}$, Value) using the grey-level enhancement mask, so as to obtain a target high dynamic range image;

wherein, $T_{HDR}$ is a high dynamic range saturation threshold, $Value_1$ is a maximum grey-level value in the image after the grey-level adjustment, and Value is a maximum grey-level value in the target high dynamic range image.

Preferably, the generating a smooth enhancement mask includes the following steps:

performing binarized segmentation of the image after the grey-level adjustment with the preset high dynamic saturation threshold, so as to obtain a corresponding binarized image;

generating a Gaussian pyramid in accordance with the binarized image, and defining a smooth enhancement mask as being equal to the Gaussian pyramid; and performing multiple Gaussian blur to the smooth enhancement mask, and outputting the smooth enhancement mask.

Preferably, performing multiple Gaussian blur to the smooth enhancement mask includes the following steps:

assuming i=k, performing Gaussian blur to the smooth enhancement mask;

deducting 1 from the value of i after each Gaussian blur;

conducting upsampling to the smooth enhancement mask, and performing Gaussian blur repeatedly to the smooth enhancement mask, if i>0; and outputting the smooth enhancement mask, if i≤0.

Preferably, the grey-level enhancement further includes the step of generating an edge enhancement mask, and generating the grey-level enhancement mask in accordance with the smooth enhancement mask and the edge enhancement mask.

Preferably, the generating an edge enhancement mask includes the following steps:

selecting a seed pixel in each of the saturation areas in accordance with the Gaussian pyramid;

performing flood fill in the image with the seed pixel after the smooth enhancement, and calculating an edge stopping mask;

performing pyramid subsampling to the edge stopping mask; and performing multiple dilation and opening operations to the edge enhancement mask, assuming the edge enhancement mask to be equal to the Gaussian pyramid, and outputting the edge enhancement mask.

Preferably, performing multiple dilation and opening operations to the edge enhancement mask includes the following steps:

assuming i=k, performing dilation to the edge enhancement mask;

updating the edge enhancement mask in accordance with the following formula:

s_mask=e_mask & s_mask;

wherein, s_mask is the edge enhancement mask, e_mask is the edge stopping mask;

performing an opening operation to the edge enhancement mask;

deducting 1 from the value of i after each opening operation;

performing upsampling of the edge enhancement mask, and repeating dilation, if i>0; and outputting the edge enhancement mask, if i≤0.

Preferably, the generating a grey-level enhancement mask includes the following steps:

generating the grey-level enhancement mask in accordance with the following formula:

mask=b_mask*s_mask;

wherein, mask is the grey-level enhancement mask, b_mask is the smooth enhancement mask, and s_mask is the edge enhancement mask;

normalizing the grey-level enhancement mask as [1, α], wherein α=1/β, and β is a preset compression factor; and outputting the grey-level enhancement mask.

The method for generating a high dynamic range image from a low dynamic range image provided by the present invention has the following advantages:

The present invention provides a technical solution for generating a high dynamic range image from a low dynamic range image, wherein it is able to display a corrected image directly by correcting grey-level values of the image through inverse-gamma correction; brightness of the image can be improved, and a blocking phenomenon of the image during inverse-gamma mapping can be ameliorated by contrast stretch; and smooth enhancement of the saturation area with a grey-level value greater than a preset saturation threshold results in an enhanced saturation area of the image, thereby improving image display quality and reducing image information loss.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

Other features, purposes and advantages of the present invention will become apparent by reading the detailed description of non-limiting embodiments in conjunction with the following drawings.

DETAILED DESCRIPTION

Exemplary implementations will be described in a more all-rounded way referring to the drawings. However, the exemplary implementations, which can be carried out in a variety of manners, shall not be construed as being confined to those described herein. Rather, these implementations are provided to render the present invention in a comprehensive and complete way, and to convey the concept of these exemplary implementations to those skilled in the art comprehensively. In the drawings, like numeral notations indicate the same or similar structures, and repeated descriptions thereof are omitted as a result.

To adapt to most of display devices, a low dynamic range image and video source at the front end is generally subjected to gamma (γ) correction, whereas the display screen of an LED (light emitting diode) has a substantially linear transfer feature, which requires inverse-gamma correction for correcting data back. In this way, there is no need to adjust the gamma feature of the LED display screen, making it possible to directly display the corrected image. Meanwhile, in order to bring about better compatibility and display effect of low dynamic range images and videos on an LED display screen for high dynamic range images, the present invention presents a method for transforming traditional low dynamic range images and videos into high dynamic range ones.

Figure 1:
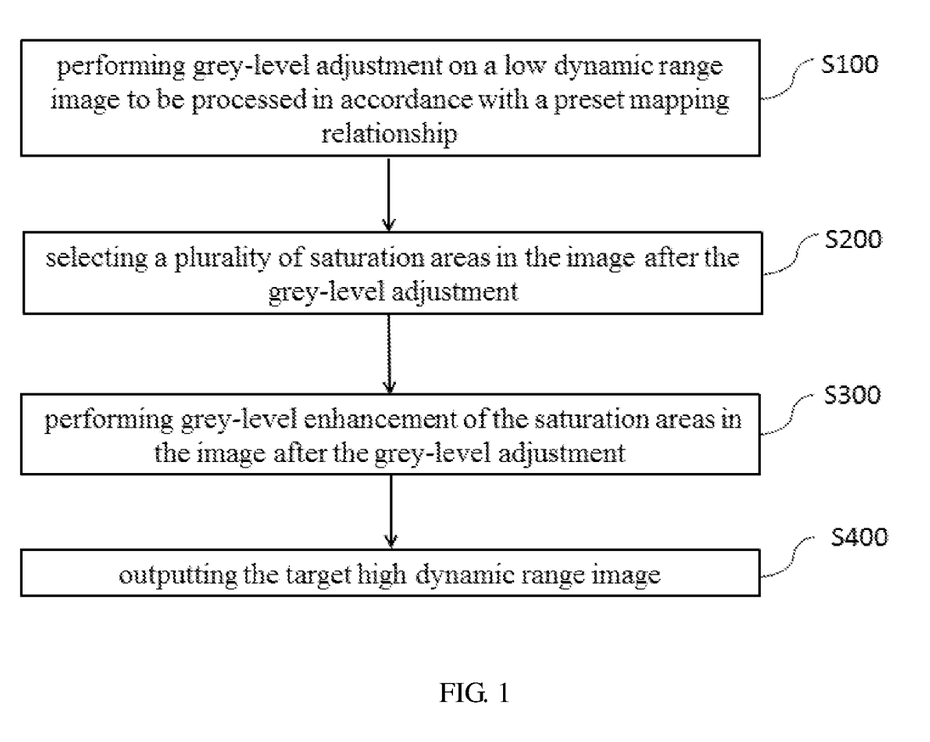
FIG. 1 is a flowchart for a method for generating a high dynamic range image from a low dynamic range image of the present invention.

As shown in FIG. 1, an embodiment of the present invention provides a method for generating a high dynamic range image from a low dynamic range image, the method including the following steps:

S100: performing grey-level adjustment on a low dynamic range image to be processed in accordance with a preset mapping relationship to obtain an image after the grey-level adjustment, wherein the grey-level adjustment includes inverse-gamma correction and grey-level value increase;

Herein, the grey-level adjustment targets the whole low dynamic range image to be processed;

S200: selecting a plurality of saturation areas in the image after the grey-level adjustment, wherein the grey-level value of pixels in the saturation areas is greater than a preset high dynamic saturation threshold;

Through this step, the image after the grey-level adjustment is divided into two major parts, one of which is a low grey-level area with an initial grey-level value smaller than the preset saturation threshold, the other of which is a saturation area with an initial grey-level value greater than or equal to the preset saturation threshold;

S300: performing grey-level enhancement of the saturation areas in the image after the grey-level adjustment, to obtain a target high dynamic range image;

After the grey-level adjustment, performing grey-level enhancement to the saturation areas individually, i.e. improving the brightness of the saturation area part and boosting display effect thereof;

S400: outputting the target high dynamic range image.

One embodiment of the present invention is designed such that during the process of mapping the low dynamic range image to a high dynamic range image, the low grey-level area and saturation area are processed respectively, so as to reduce image information loss and improve image display quality. The boundary between the saturation area and the low grey-level area is at the preset high dynamic saturation threshold $T_{HDR}$, which is determined via mapping with a preset saturation threshold T. The preset saturation threshold T refers to a boundary point between the low grey-level area and the saturation area in a low dynamic range image to be processed. After the grey-level adjustment of the low dynamic range image to be processed, the preset saturation threshold T is mapped as a preset high dynamic saturation threshold $T_{HDR}$ correspondingly. And the preset saturation threshold T is generally selected as an empiric value upon multiple experiments.

Figure 2:
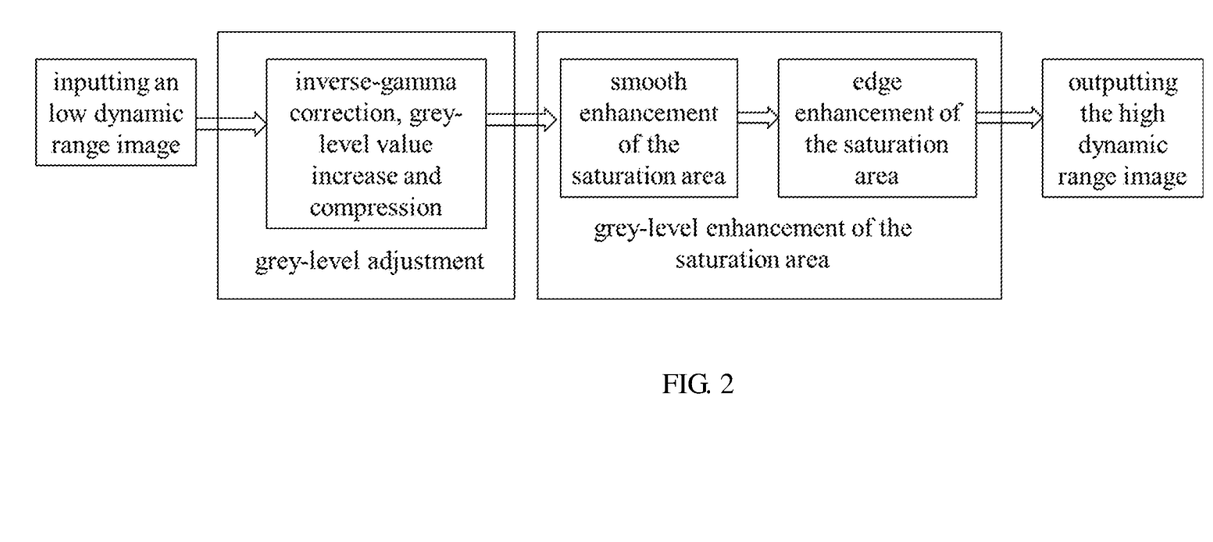
FIG. 2 is a flowchart for the method for generating a high dynamic range image from a low dynamic range image in one embodiment of the present invention.

As shown in FIG. 2, the method in the present invention consists of grey-level adjustment and brightness enhancement. The grey-level adjustment refers to mapping the non-linear brightness of an image into linear ones, i.e., contrast stretch, specifically including inverse-gamma mapping and grey-level value increase. The brightness enhancement is used for smooth and brightness enhancement of the saturation area in the image, i.e., grey-level enhancement of the saturation area.

Inverse-gamma mapping has the same realization model as gamma transformation, except that different parameters are inputted for gamma, leading to changes in the mapping curve, allowing outputted results to deliver different effects. The gamma correction compensates for the difference in color display between different output devices, so that the image is rendered with the same effect on different monitors.

The LED display screen has a substantially linear transfer feature, and a video source at the front end is generally subjected to gamma correction, therefore, inverse-gamma correction is required for correcting data back. Typically, a display look-up table (LUT, look-up table) can be used to realize data correction, which can be fulfilled perfectly in an FPGA (Field-Programmable Gate Array) using ROM (read-only memory). In an attempt to adapt to different features, working environment and watching preferences, different gamma values, for instance 2.2-2.8, may be selected, to be prepared into a plurality of display look-up tables, or multiple curves, and a user can make a choice therebetween.

With the gamma value, γ increased, graphic contrast improved and hierarchy becoming clear, the contrast gradient will be decreased, for example, when γ=2.8, 256 grey level is merely divided into 180 grey level, lowering video display capability. Thus, at the same time, when inverse-gamma correction is performed, the display look-up table is usually required to be outputted in more bits, so as to obtain better grey-scale rendering performance and color expressiveness with the inputted scales unchanged. Hence, grey-level adjustment is preferably performed in accordance with the following formula:

$$C(i) = (2^n - 1)\left[\frac{i}{2^m - 1}\right]^{\frac{1}{\gamma}} \quad (1\text{-}1)$$

wherein, C(i) is a grey-level value of each pixel in the image after the grey-level adjustment, i is a grey-level value of each pixel in the low dynamic range image to be processed, i.e. an address in the display look-up table, and i∈[0,255], i.e., LUT(i) ∈ [0, $2^n$-1]; m is the number of grey level of the low dynamic range image to be processed, n is the number of grey level of the image after the grey-level adjustment, and m≤n; γ is a preset gamma value.

After the inverse-gamma mapping, the low grey-level area of the image will experience waning of layering in its dark area and distinct color blocking, hence mapping uplift of the low grey-level area can efficiently improve the display effect. And the low grey-level area can be processed in a linear uplift or nonlinear uplift mode. Linear uplift refers to the adoption of linear mapping below a certain pixel value; and nonlinear uplift refers to averaging the values of the original curve and a linear mapping curve. The following formulas are shown as (2-1), and (3-1).

With linear uplift adopted, the grey-level adjustment is performed in accordance with the following formula:

$$C(i) = \begin{cases} (2^n - 1)\left[\frac{i}{2^m - 1}\right]^{\frac{1}{\gamma}}, & i \geq \frac{\gamma}{8}2^n \\ k \cdot i, & i < \frac{\gamma}{8}2^n \end{cases} \quad (2\text{-}1)$$

$$k = \frac{C(\frac{\gamma}{8}2^n)}{\frac{\gamma}{8}2^n}$$

With nonlinear uplift adopted, the grey-level adjustment is performed in accordance with the following formula:

$$C(i) = \begin{cases} (2^n - 1)\left[\frac{i}{2^m - 1}\right]^{\frac{1}{\gamma}}, & i \geq \frac{\gamma}{8}2^n \\ \left(k \cdot i + (2^n - 1)\left[\frac{i}{2^m - 1}\right]^{\frac{1}{\gamma}}\right)/2, & i < \frac{\gamma}{8}2^n \end{cases} \quad (3\text{-}1)$$

$$k = \frac{C(\frac{\gamma}{8}2^n)}{\frac{\gamma}{8}2^n}$$

Further, a step of compressing the grey-level value is necessary after the inverse-gamma correction and grey-level value increase, so that a subsequent grey-level enhancement, i.e., highlighting the brightness, of the saturation area can be performed. The grey-level adjustment includes steps of inverse-gamma correction, grey-level value increase and grey-level value compression. In this embodiment, a preset compression factor β is adopted for the grey-level value compression, wherein, 0<β≤1, and there is no compression when β=1.

Specifically, the above formulas (1-1), (2-1) and (3-1) are converted into the following formulas (1), (2) and (3).

$$C(i) = \beta(2^n - 1)\left[\frac{i}{2^m - 1}\right]^{\frac{1}{\gamma}} \quad (1)$$

A grey-level adjustment formula for linear uplift of the low grey-level area:

$$C(i) = \begin{cases} \beta \cdot (2^n - 1)\left[\frac{i}{2^m - 1}\right]^{\frac{1}{\gamma}}, & i \geq \frac{\gamma}{8}2^n \\ \beta \cdot k \cdot i, & i < \frac{\gamma}{8}2^n \end{cases} \quad (2)$$

$$k = \frac{C(\frac{\gamma}{8}2^n)}{\frac{\gamma}{8}2^n}$$

A grey-level adjustment formula for nonlinear uplift of the low grey-level area:

$$C(i) = \begin{cases} \beta \cdot (2^n - 1)\left[\dfrac{i}{2^m - 1}\right]^{\frac{1}{\gamma}}, & i \geq \dfrac{\gamma}{8} 2^n \\ \beta \cdot \left(k \cdot i + (2^n - 1)\left[\dfrac{i}{2^m - 1}\right]^{\frac{1}{\gamma}}\right) \bigg/ 2, & i < \dfrac{\gamma}{8} 2^n \end{cases} \quad (3)$$

$$k = \dfrac{C\left(\dfrac{\gamma}{8} 2^n\right)}{\dfrac{\gamma}{8} 2^n}$$

Figure 3:
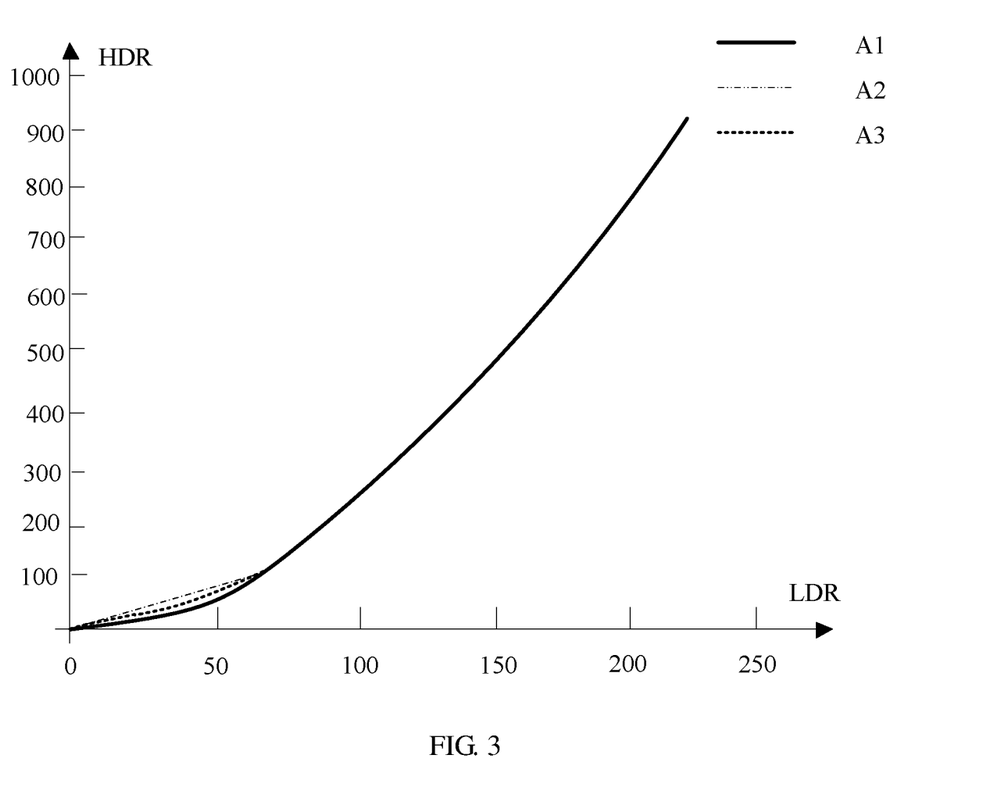
FIG. 3 is a contrast curve for grey-level values of inverse-gamma correction in one embodiment of the present invention.

FIG. 3 is a corrected curve diagram with the adoption of formulas (1), (2) and (3). In FIG. 3, the horizontal ordinate indicates the grey-level value of a low dynamic range image, the vertical ordinate indicates the grey-level value of an image after the grey-level adjustment, an A1 curve segment is a curve corresponding to the grey-level value after the grey-level adjustment adopting the above formula (1), A2 is a linear segment corresponding to the grey-level value after linear uplift adopting the following formula (2), and A3 is a curve segment corresponding to the grey-level value after nonlinear uplift adopting the following formula (3), wherein, k refers to the slope of a line connecting the boundary point between an uplift area and a non-uplift area portion and the point (0,0) when the linear uplift or the nonlinear uplift is performed.

It can be seen from FIG. 3 that, in contrast to the adoption of formula (1) alone, performing uplift with formula (2) or formula (3) can efficiently uplift the grey-level value of the low grey-level area, avoiding loss of efficient image information because of unduly low brightness, and improving the display effect of the image.

FIG. 2 and FIG. 3 merely illustrate a preferable implementation of the grey-level adjustment adopted by one embodiment of the present invention. Firstly, the grey-level value of the low dynamic range image to be processed is corrected via inverse-gamma correction, then, the linear uplift or the nonlinear uplift is conducted to the grey-level value of the low grey-level area, so as to maximally retain the image information of the low grey-level area, and mitigate blocking of the image during inverse-gamma mapping.

Practically, other forms of inverse-gamma correction and grey-level value increase can be adopted, for lifting the grey-level value range of a low dynamic range image to the grey-level value range of a high dynamic range image, as well as fulfilling the purpose of the present invention of converting a low dynamic range image into a high dynamic range one, both of which fall into the protection scope of the present invention.

Further, in this embodiment, the grey-level enhancement of the saturation area includes the following steps:
generating a smooth enhancement mask;
generating a grey-level enhancement mask in accordance with the smooth enhancement mask;
enhancing the grey-level value of the saturation areas in the image after the grey-level adjustment from a range of $(T_{HDR}, Value_1)$ to a range of $(T_{HDR}, Value)$ using the grey-level enhancement mask, so as to obtain a target high dynamic range image;
wherein, $T_{HDR}$ is a high dynamic range saturation threshold, $Value_1$ is a maximum grey-level value in the image after the grey-level adjustment, Value is a maximum grey-level value in the target high dynamic range image.

Because a preset compression factor $\beta$ is adopted to conduct grey-level value compression prior to the grey-level enhancement in this embodiment, $Value_1$ is, as a matter of fact, $\beta$*Value.

To be noted, in this embodiment, when only inverse-gamma correction and grey-level value increase are performed, the maximum grey-level value of image has been lifted to a maximum grey-level value allowed by a high dynamic range image; and it requires the grey-level value of the whole image to be compressed for the saturation area to undergo smooth enhancement. However, in practice, there are scenarios when the whole image is dark, i.e., after grey-level value increase, the maximum grey-level value of the image is yet to reach the maximum grey-level value allowed by high dynamic range image. In such cases, it will do even without the grey-level value compression, to perform smooth enhancement of the saturation area within a certain range, which still falls into the protection scope of the present invention.

Figure 4:
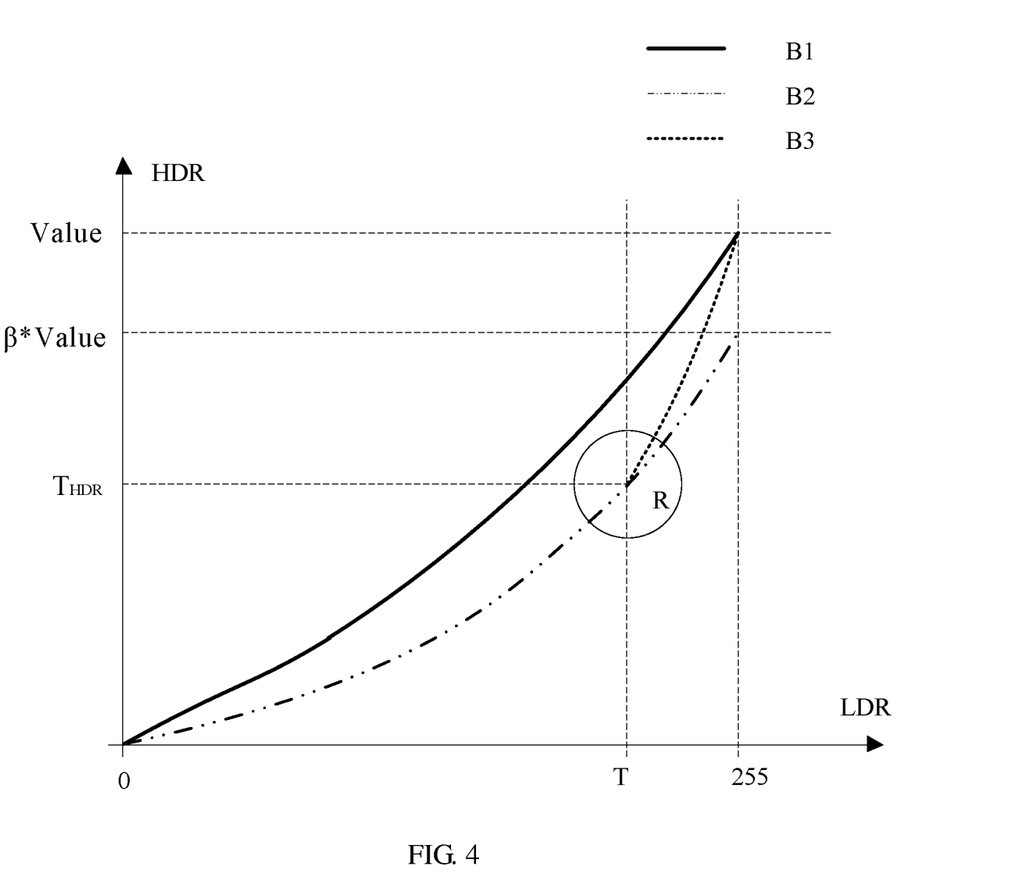
FIG. 4 is a contrast curve for grey-level values of grey-level adjustment and grey-level enhancement in one embodiment of the present invention.

FIG. 4 is a corresponding grey-level diagram after the adoption of inverse-gamma correction, grey-level value increase, grey-level value compression and grey-level enhancement. The horizontal ordinate indicates the grey-level value of a low dynamic range image, the vertical ordinate indicates the grey-level value of a target high dynamic range image. A curve segment B1 represents a grey-level change curve of the image after inverse-gamma correction and grey-level value increase, a curve segment B2 represents a grey-level change curve of the image after grey-level value compression, and a curve segment B3 represents a grey-level curve after grey-level enhancement in the saturation area.

Corresponding to FIG. 4, the low dynamic range image in this embodiment undergoes the following three processes:
(1) curve B1: inverse-gamma correction and grey-level value increase, so as to complete the mapping from the grey-level value of a low dynamic range image to that of a high dynamic range image;

Although a mere adoption of the mode shown in curve B1 can also realize the conversion of a low dynamic range image to a high dynamic range image, in a saturation area portion (with a grey-level value of (T,255) before processing and a grey-level value of $(T_{HDR}, Value)$ after grey-level value increase), its grey-level value is not distinct from that of a low grey-level area, hence contrast in the grey-level value between the saturation area and the low grey-level area needs to be further enhanced, so as to form a sharper contrast, thereby rendering more desirable image display effect. However, in this embodiment, since the uplifted grey-level value has already reached the maximum grey-level value of a high dynamic range image, proceeding of the grey-level enhancement is unavailable if the grey-level value of the saturation area is directly enhanced, therefore, grey-level value compression is called for;

(2) from curve B1 to curve B2: grey-level value compression, wherein, curve B1 is obtained via compression with a preset compression factor, after the grey-level value compression, the grey-level value of the saturation area portion is changed from $(T_{HDR}, Value)$ to $(T_{HDR}, \beta*Value)$, and there is room for further enhancement, with $0<\beta\leq1$;

(3) from curve B2 to curve B3: smooth enhancement of the saturation area, as stated above, the grey-level value of the saturation area of the image after the grey-level adjustment changes from a range of $(T_{HDR}, Value_1)$ to a range of $(T_{HDR}, Value)$ via smooth enhancement, so as to obtain an image after smooth enhancement.

Figure 5:
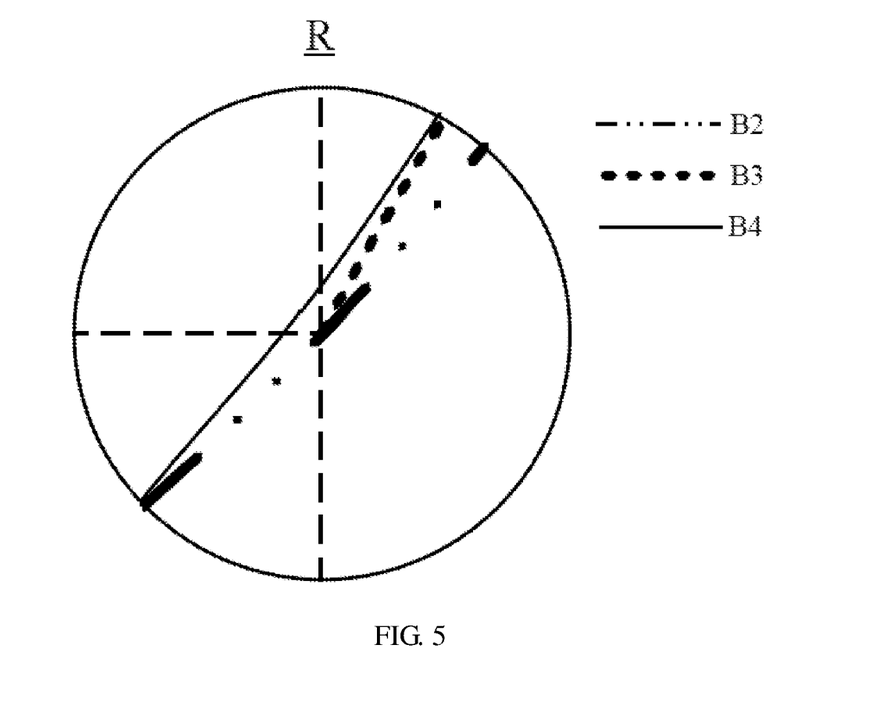
FIG. 5 is an enlarged drawing of R in FIG. 4.

As shown in FIG. 5, curve B4 is further added in FIG. 5, for a smooth transition from curve B2 to curve B3, so as to avoid an abrupt bend at the intersection of curve B2 and curve B3, resulting in more natural transition of the image and better display effect.

Figure 6:
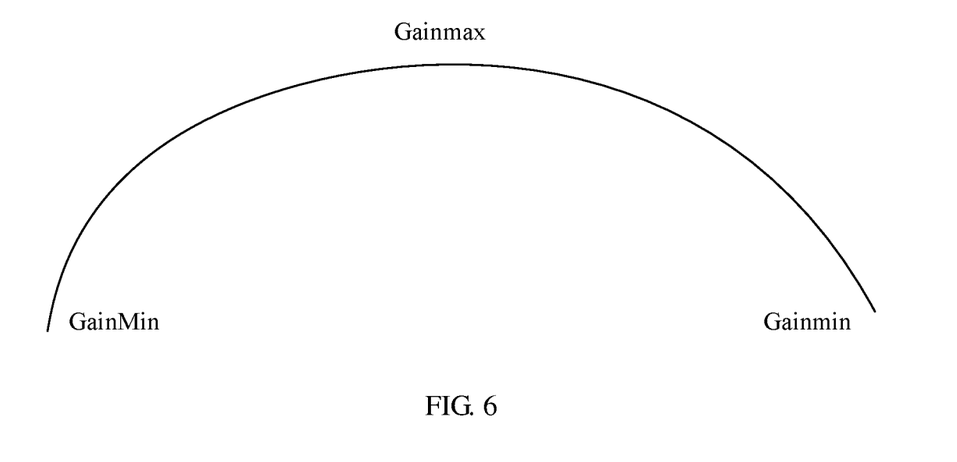
FIG. 6 is a change curve for gains during grey-level enhancement in one embodiment of the present invention.

Moreover, during the smooth enhancement of the saturation area, expanding the dynamic range with only one global function will give rise to an issue of quantization, i.e., significant difference between two brightness levels, therefore, a brightness enhancement algorithm is needed to attenuate the difference, as an oversaturated area will endure a loss of excessive details. The brightness enhancement of a saturation area, which can increase the contrast among details, is a gain mask large in the middle and tapering towards the periphery. FIG. 6 illustrates a change curve for the gain during grey-level enhancement.

Figure 7:
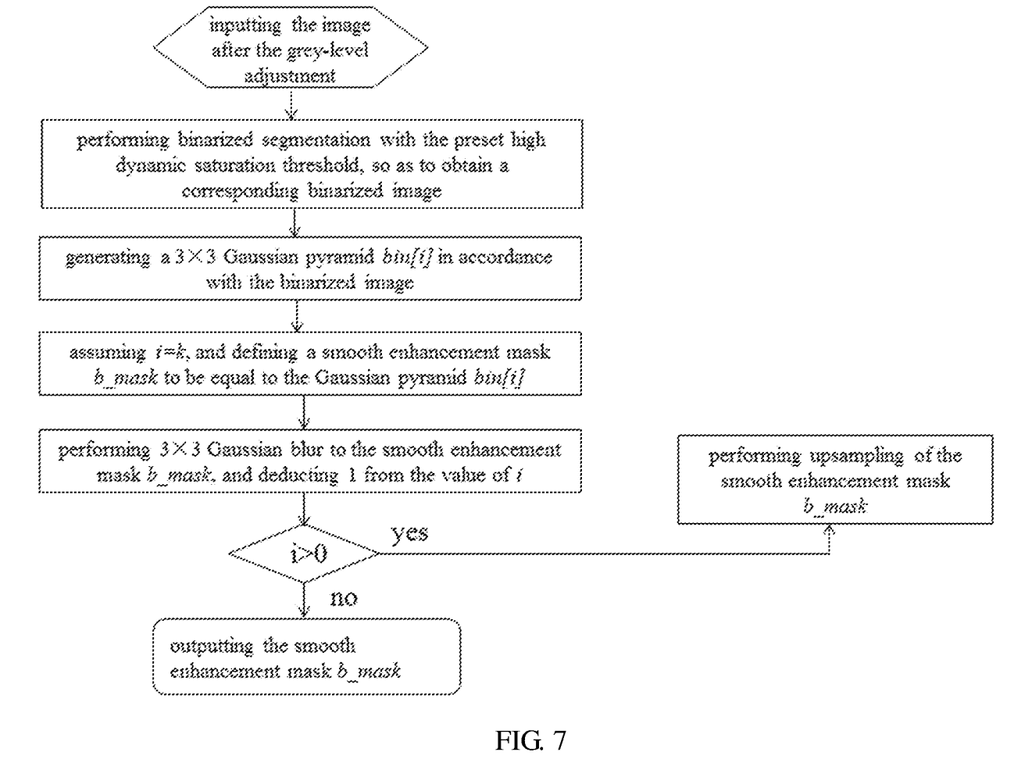
FIG. 7 is a smooth enhancement flowchart in one embodiment of the present invention.

As shown in FIG. 7, in this embodiment, generating the smooth enhancement mask includes the following steps:

firstly inputting the image after the grey-level adjustment;

performing binarized segmentation with the preset high dynamic saturation threshold $T_{TDR}$, so as to obtain a corresponding binarized image binary;

generating a Gaussian pyramid bin[i]($i \leq k$) (3×3) in accordance with the binarized image binary;

assuming i=k, and defining a smooth enhancement mask b_mask to be equal to the Gaussian pyramid, i.e., b_mask=bin[i]; and performing multiple Gaussian blur to the smooth enhancement mask b_mask, and outputting the smooth enhancement mask b_mask.

Specifically, performing multiple Gaussian blur to the smooth enhancement mask b_mask includes the following steps:

performing 3×3 Gaussian blur to the smooth enhancement mask b_mask;

i—, i.e., deducting 1 from the value of i after each Gaussian blur;

determining if the value of i is greater than 0;

conducting upsampling to the smooth enhancement mask b_mask, and performing Gaussian blur repeatedly to the smooth enhancement mask, if i>0, herein the upsampling of the smooth enhancement mask b_mask is usually conducted in an interlaced way; and outputting the smooth enhancement mask b_mask, if $i \leq 0$.

The smooth enhancement mask b_mask is one that is capable of enabling a protection area of the image after the grey-level adjustment to obtain smooth enhancement gain, namely, the smooth enhancement mask has the same pixel number as the image after the grey-level adjustment does, and the value of its each pixel equals to the smooth enhancement gain corresponding to the pixel, and a smooth enhancement image can be obtained by processing the image after the grey-level adjustment with the smooth enhancement mask.

Further, the grey-level enhancement of the saturation area, besides the smooth enhancement, also includes edge detection and edge enhancement thereof. The former is to constitute a gradient gain mask in the saturation area; while the latter is to retain the edge within or around the saturation area (edge enhancement).

Therefore, the grey-level enhancement further includes a step of generating an edge enhancement mask, wherein the grey-level enhancement mask is generated by fitting the smooth enhancement mask with the edge enhancement mask.

Figure 8:
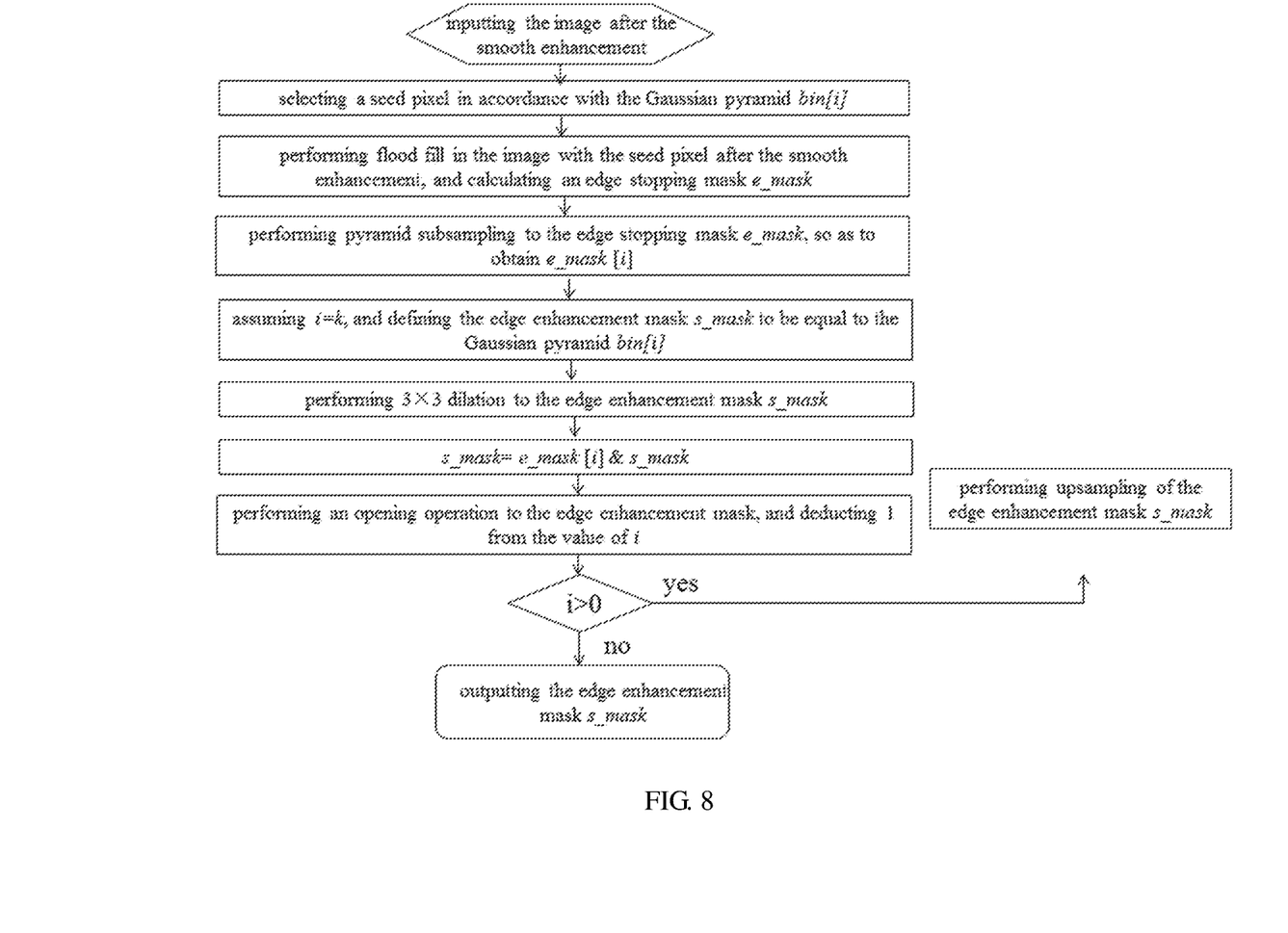
FIG. 8 is an edge enhancement flowchart in one embodiment of the present invention.

As shown in FIG. 8, generating the edge enhancement mask includes the following steps:

inputting the image after the smooth enhancement;

selecting a seed pixel seeds in each of the saturation areas in accordance with the Gaussian pyramid bin[i];

performing flood fill in the image with the seed pixel seeds after the smooth enhancement, and calculating an edge stopping mask e_mask;

performing pyramid sub sampling to the edge stopping mask e_mask, so as to obtain e_mask[i]($i \leq k$); and performing multiple dilation and opening operations to the edge enhancement mask s_mask, assuming the edge enhancement mask s_mask to be equal to the Gaussian pyramid bin[i], and outputting the edge enhancement mask s_mask.

Further, performing multiple dilation and opening operations to the edge enhancement mask includes the following steps:

assuming i=k, performing 3×3 dilation to the edge enhancement mask s_mask;

updating the edge enhancement mask in accordance with the following formula:

s_mask=e_mask & s_mask;

performing an opening operation to the edge enhancement mask s_mask;

i—, i.e., deducting 1 from the value of i after each opening operation 1;

performing upsampling of the edge enhancement mask s_mask, and repeating dilation, if i>0; and outputting the edge enhancement mask s_mask, if $i \leq 0$.

The upsampling and subsampling are usually performed in an interlaced way.

Wherein, the seed pixel is selected such that each saturation area is guaranteed to secure one point, specifically by: projecting a binarized image on the x axis, counting the number of bright points in one saturation area, pinpointing a point with the greatest brightness therein and recording the x coordinate thereof, followed by projecting in the direction of y axis, searching in the y axis direction for a point with the greatest brightness in the saturation area, and recording the y coordinate thereof. This is only method for seed pixel selection, in practical application, other approaches in the prior art for selecting a seed pixel for the flood fill can also be adopted, and each falls into the protection range of the present invention. The edge stopping mask may also be calculated using a method for calculating an edge stopping mask in the prior art.

The edge stopping mask may also be calculated in the following manner:

Firstly calculating a gradient edge gradbin of the image, then performing binarized segmentation of the grey-level image, so as to obtain graybin (herein the threshold of the binarized segmentation is smaller than that of the preset high dynamic saturation), finally, integrating gradbin and graybin to obtain edge edge, assuming e_mask=edge.

The dilation and opening operation belong to a method of mathematical morphology during processing of digital images, specifically, the dilation refers to convolution of the image with a kernel 3×3; the opening operation means subjecting the image to erosion prior to dilation, the erosion means moving the kernel 3×3 across the image, extracting the kernel 3×3 to cover a minimal pixel value, so as to replace the position of an anchor point.

Likewise, the edge enhancement mask is also an image with the same pixel number as the image after the grey-level adjustment does, wherein the value of each pixel is equal to the gain corresponding to the edge enhancement, and processing the image with the edge enhancement mask can bring about an effect of edge enhancement.

Further, generating the grey-level enhancement mask of the saturation area includes the following steps:

generating the grey-level enhancement mask in accordance with the following formula: mask=b_mask*s_mask;

normalizing the grey-level enhancement mask as [1, α], wherein α=1/β, α is a ratio of the maximum brightness of a display to a preset saturation threshold set for a current image; and outputting the grey-level enhancement mask.

Finally, the grey-level enhancement mask after the normalization can be employed to process the image after the grey-level adjustment, for performing smooth enhancement and edge enhancement of the latter; the smooth enhancement and edge detection of the saturation area enhances the grey-level value of the saturation area of the image, while retaining edges within or around the saturation area, thereby improving the display effect as well as retaining utmost information of the original image.

FIG. 7 and FIG. 8 illustrate merely one preferable implementation of the smooth enhancement and edge enhancement. Practically, other methods may also be employed for enhancement of the grey-level value of the saturation area, and detection and enhancement of the edge, all of which fall into the protection scope of the present invention. The normalization, which can make the grey-level enhancement more convenient if adopted, can also be exempted, or uses other normalization parameters, all of which fall into the protection scope of the present invention.

The method for generating a high dynamic range image from a low dynamic range image provided by the present invention has the following advantages:

The present invention provides a technical solution for generating a high dynamic range image from a low dynamic range image. Herein a corrected image can be directly displayed through correction of the grey-level value of the image via inverse-gamma correction. The contrast stretch can improve the brightness of the image, while reducing the blocking phenomenon of an image caused during inverse-gamma mapping. And the smooth enhancement of an area with a grey-level value greater than a preset saturation threshold enhances the saturation area of the image, improves image display quality while reducing image information loss.

The above contents describes the present invention in conjunction with specific preferable implementations in further detail, wherein specific implementations of the present invention shall not be construed as being confined to these descriptions. For one with ordinary skill in the art the present invention pertains to, several simple derivations or replacement made without departing from the concept of the present invention, shall be deemed as falling into the protection scope of the present invention.

What is claimed is:

1. A method for generating a high dynamic range image from a low dynamic range image, wherein, comprising the following steps:

performing grey-level adjustment on a low dynamic range image to be processed in accordance with a preset mapping relationship to obtain an image after the grey-level adjustment;

selecting a plurality of saturation areas in the image after the grey-level adjustment;

performing grey-level enhancement of the saturation areas in the image after the grey-level adjustment, to obtain a target high dynamic range image; and outputting the target high dynamic range image; wherein, the grey-level adjustment comprises inverse-gamma correction and grey-level value increase;

the grey-level value of pixels m the saturation areas is greater than a preset high dynamic saturation threshold; and the grey-level enhancement comprises the following steps:

generating a smooth enhancement mask;

generating a grey-level enhancement mask in accordance with the smooth enhancement mask; and enhancing the grey-level value of the saturation areas in the image after the grey-level adjustment from a range of ($T_{HDR}$, $Value_1$) to a range of ($T_{HDR}$, Value) using the grey-level enhancement mask, so as to obtain a target high dynamic range image, wherein, $T_{HDR}$ is a high dynamic range saturation threshold, $Value_1$ is a maximum grey-level value in the image after the grey-level adjustment, Value is a maximum grey-level value in the target high dynamic range image.

2. The method for generating a high dynamic range image from a low dynamic range image in accordance with claim 1, wherein, performing grey-level adjustment in accordance with the following formula:

$$C(i) = (2^n - 1)\left[\frac{i}{2^m - 1}\right]^{\frac{1}{\gamma}}$$

wherein, C(i) is a grey-level value of each pixel in the image after the grey-level adjustment, i is a grey-level value of each pixel in the low dynamic range image to be processed, and i∈[0,255];

m is the number of grey level of the low dynamic range image to be processed, n IS the number of grey level of the image after the grey-level adjustment, and m≤n; and γ is a preset gamma value.

3. The method for generating a high dynamic range image from a low dynamic range image in accordance with claim 1, wherein, performing grey-level adjustment in accordance with the following formula:

$$C(i) = \begin{cases} ((2^n - 1)\left[\frac{i}{2^m - 1}\right]^{\frac{1}{\gamma}}, & i \geq \frac{\gamma}{8}2^n \\ k \cdot i, & i < \frac{\gamma}{8}2^n \end{cases};$$

$$k = \frac{C(\frac{\gamma}{8}2^n)}{\frac{\gamma}{8}2^n};$$

wherein, C(i) is a grey-level value of each pixel in the image after the grey-level adjustment, i is a grey-level value of each pixel in the low dynamic range image to be processed, and i∈[0,255];

m is the number of grey level of the low dynamic range image to be processed, n is the number of grey level of the image after the grey-level adjustment, and m≤n; and γ is a preset gamma value.

4. The method for generating a high dynamic range image from a low dynamic range image in accordance with claim 1, wherein, performing grey-level adjustment in accordance with the following formula:

$$C(i) = \begin{cases} (2^n-1)\left[\dfrac{i}{2^m-1}\right]^{\frac{1}{\gamma}}, & i \geq \dfrac{\gamma}{8}2^n \\ \left(k \cdot i + (2^n-1)\left[\dfrac{i}{2^m-1}\right]^{\frac{1}{\gamma}}\right)\Big/2, & i < \dfrac{\gamma}{8}2^n \end{cases};$$

$$k = \dfrac{C\left(\dfrac{\gamma}{8}2^n\right)}{\dfrac{\gamma}{8}2^n};$$

wherein, $C(i)$ is a grey-level value of each pixel in the image after the grey-level adjustment, i is a grey-level value of each pixel in the low dynamic range image to be processed, and $i \in [0,255]$;

m is the number of grey level of the low dynamic range image to be processed, n is the number of grey level of the image after the grey-level adjustment, and $m \leq n$; and γ is a preset gamma value.

5. The method for generating a high dynamic range image from a low dynamic range image in accordance with claim 1, wherein the grey-level adjustment further comprises grey-level compression, and performing grey-level adjustment in accordance with the following formula:

$$C(i) = \begin{cases} \beta \cdot (2^n-1)\left[\dfrac{i}{2^m-1}\right]^{\frac{1}{\gamma}}, & i \geq \dfrac{\gamma}{8}2^n \\ \beta \cdot k \cdot i, & i < \dfrac{\gamma}{8}2^n \end{cases};$$

$$k = \dfrac{C\left(\dfrac{\gamma}{8}2^n\right)}{\dfrac{\gamma}{8}2^n};$$

wherein, $C(i)$ is a grey-level value of each pixel in the image after the grey-level adjustment, i is a grey-level value of each pixel in the low dynamic range image to be processed, and $i \in [0,255]$;

m is the number of grey level of the low dynamic range image to be processed, n is the number of grey level of the image after the grey-level adjustment, and $m \leq n$; and γ is a preset gamma value, β is a preset compression factor, and $0 < \beta \leq 1$.

6. The method for generating a high dynamic range image from a low dynamic range image in accordance with claim 1, wherein the grey-level adjustment further comprises grey-level compression, and performing grey-level adjustment in accordance with the following formula:

$$C(i) = \begin{cases} \beta \cdot (2^n-1)\left[\dfrac{i}{2^m-1}\right]^{\frac{1}{\gamma}}, & i \geq \dfrac{\gamma}{8}2^n \\ \beta \cdot \left(k \cdot i + (2^n-1)\left[\dfrac{i}{2^m-1}\right]^{\frac{1}{\gamma}}\right)\Big/2, & i < \dfrac{\gamma}{8}2^n \end{cases};$$

$$k = \dfrac{C\left(\dfrac{\gamma}{8}2^n\right)}{\dfrac{\gamma}{8}2^n};$$

wherein, $C(i)$ is a grey-level value of each pixel in the image after the grey-level adjustment, i is a grey-level value of each pixel in the low dynamic range image to be processed, and $i \in [0,255]$;

m is the number of grey level of the low dynamic range image to be processed, n is the number of grey level of the image after the grey-level adjustment, and $m \leq n$; and γ is a preset gamma value, β is a preset compression factor, and $0 < \beta \leq 1$.

7. The method for generating a high dynamic range image from a low dynamic range image in accordance with claim 6, wherein the grey-level enhancement comprises the following steps:

generating a smooth enhancement mask;

generating a grey-level enhancement mask in accordance with the smooth enhancement mask;

enhancing the grey-level value of the saturation areas in the image after the grey-level adjustment from a range of ($T_{HDR}$, $Value_1$) to a range of ($T_{HDR}$, Value) using the grey-level enhancement mask, so as to obtain a target high dynamic range image;

wherein, $T_{HDR}$ is a high dynamic range saturation threshold, $Value_1$ is a maximum grey-level value in the image after the grey-level adjustment, Value is a maximum grey-level value in the target high dynamic range image.

8. The method for generating a high dynamic range image from a low dynamic range image in accordance with claim 1, wherein the generating a smooth enhancement mask comprises the following steps:

performing binarized segmentation of the image after the grey-level adjustment with the preset high dynamic saturation threshold, so as to obtain a corresponding binarized image;

generating a Gaussian pyramid in accordance with the binarized image, and defining a smooth enhancement mask as being equal to the Gaussian pyramid; and performing multiple Gaussian blur to the smooth enhancement mask, and outputting the smooth enhancement mask.

9. The method for generating a high dynamic range image from a low dynamic range image in accordance with claim 8, wherein performing multiple Gaussian blur to the smooth enhancement mask comprises the following steps:

assuming i=k, performing Gaussian blur to the smooth enhancement mask;

deducting 1 from the value of i after each Gaussian blur;

conducting upsampling to the smooth enhancement mask, and performing Gaussian blur repeatedly to the smooth enhancement mask, if i>0; and outputting the smooth enhancement mask, if i≤0.

10. The method for generating a high dynamic range image from a low dynamic range image in accordance with claim 8, wherein the grey-level enhancement further comprises the step of generating an edge enhancement mask, and generating the grey-level enhancement mask in accordance with the smooth enhancement mask and the edge enhancement mask.

11. The method for generating a high dynamic range image from a low dynamic range image in accordance with claim 10, wherein the generating an edge enhancement mask comprises the following steps:

selecting a seed pixel in each of the saturation areas in accordance with the Gaussian pyramid;

performing the flood fill algorithm in the image with the seed pixel after the smooth enhancement, and calculating an edge stopping mask;

performing pyramid subsampling to the edge stopping mask; and performing multiple dilation and opening operations to the edge enhancement mask, with the edge enhancement mask to be equal to the Gaussian pyramid, and outputting the edge enhancement mask.

12. The method for generating a high dynamic range image from a low dynamic range image in accordance with claim 11, wherein performing multiple dilation and opening operations to the edge enhancement mask comprises the following steps:

assuming i=k, performing dilation to the edge enhancement mask;

updating the edge enhancement mask in accordance with the following formula:

$$s\_mask = e\_mask \ \& \ s\_mask;$$

wherein, s_mask is the edge enhancement mask, e_mask is the edge stopping mask;

performing an opening operation to the edge enhancement mask;

deducting 1 from the value of i after each opening operation;

performing upsampling of the edge enhancement mask, and repeating dilation, if i>0; and outputting the edge enhancement mask, if i≤0.

13. The method for generating a high dynamic range image from a low dynamic range image in accordance with claim 11, wherein the generating a grey-level enhancement mask comprises the following steps:

generating the grey-level enhancement mask m accordance with the following formula:

$$mask = b\_mask * s\_mask;$$

wherein, mask is the grey-level enhancement mask, b_mask is the smooth enhancement mask, and s_mask is the edge enhancement mask;

normalizing the grey-level enhancement mask as [1, α], wherein α=1/β, and β is a preset compression factor; and outputting the grey-level enhancement mask.

* * * * *